United States Patent [19]
Dickel et al.

[11] 3,880,916
[45] Apr. 29, 1975

[54] CYCLOALIPHATIC ACIDS

[75] Inventors: Daniel Frederick Dickel, Berkeley Heights; George De Stevens, Summit, both of N.J.

[73] Assignee: Ciba-Geigy Corporation, Ardsley, N.Y.

[22] Filed: Apr. 12, 1973

[21] Appl. No.: 350,447

Related U.S. Application Data

[63] Continuation-in-part of Ser. No. 858,893, Sept. 17, 1969, Pat. No. 3,786,085, which is a continuation-in-part of Ser. No. 808,341, March 18, 1969, abandoned, which is a continuation-in-part of Ser. No. 789,076, Jan. 2, 1969, abandoned, which is a continuation-in-part of Ser. No. 716,290, March 27, 1968, abandoned.

[52] U.S. Cl......................... 515 R; 260/247.7 H;
260/326.5 E; 260/348 R; 260/465 D; 260/470;
260/471 R; 260/473 C; 260/473 R; 260/475 R;
260/476; 260/479 R; 260/501.15; 260/507 R;
260/515 R; 260/515 A; 260/515 M; 260/515 P;
260/516; 260/518 R; 260/520; 260/521 R;
260/558 R; 260/562 R; 260/599; 424/248;
424/274; 424/308; 424/309; 424/317; 424/319
[51] Int. Cl....................... C07c 63/50; C07c 63/60
[58] Field of Search........ 260/515 R, 469, 473, 471, 260/518, 520

[56] References Cited
UNITED STATES PATENTS
3,457,300    7/1969    Dorn et al.................. 260/515
3,822,309    7/1974    Rossi...................... 260/515

OTHER PUBLICATIONS

Horclois, Chem. Abstracts, Vol. 29 (1935), pp. 140–141.

Bencze, Chem. Abstracts, Vol. 73 (1970), pp. 333-1.

*Primary Examiner*—James A. Patten
*Attorney, Agent, or Firm*—Joseph G. Kolodny; Theodore O. Groeger; John J. Maitner

[57] ABSTRACT

New α-aryl-cycloaliphatic acids, e.g., those of the formula

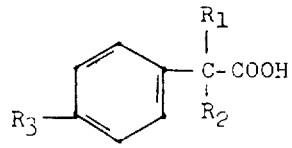

$R_1$ = H or alk(en)yl
$R_2$ = cycloalk(en)yl or cycloalk(en)yl-alkyl
$R_3$ = aliphatic, cycloaliphatic, araliphatic or aromatic radical, $CF_3$, $NO_2$, acyl, free or functionally converted OH, SH, carboxy or sulfo and functional acid derivatives thereof, are antiinflammatory agents.

5 Claims, No Drawings

CYCLOALIPHATIC ACIDS

CROSS-REFERENCE TO RELATED APPLICATIONS

This is a continuation-in-part of application Ser. No. 858,893, filed Sept. 17, 1969, now U.S. Pat. NO. 3,786,085 which in turn is a continuation-in-part of application Ser. No. 808,341, filed Mar. 18, 1969, which in turn is a continuation-in-part of application Ser. No. 789,076, filed Jan. 2, 1969, which in turn is a continuation-in-part of application Ser. No. 716,290, filed Mar. 27, 1968, the latter three of which are now abandoned.

SUMMARY OF THE INVENTION

The present invention concerns and has for its object the provision of new α-aryl-cycloaliphatic acids of the Formula I

in which Ph is a 1,4-phenylene radical, $R_1$ is hydrogen, lower alkyl or alkenyl, $R_2$ is cycloalkyl, cycloalkenyl, cycloalkyl-lower alkyl or cycloalkenyl-lower alkyl and $R_3$ is an aliphatic, cycloaliphatic, araliphatic or aromatic radical, free or esterified hydroxy, free or etherified mercapto, trifluoromethyl, nitro, amino, acyl, free or functionally converted carboxy or sulfo, of the therapeutically acceptable functional derivatives thereof, as well as of corresponding pharmaceutical compositions and of methods for the preparation and application of these products. Said compositions are useful anti-inflammatory agents in the treatment or management of arthritic and dermatopathologic conditions.

DESCRIPTION OF THE PREFERRED EMBODIMENT

The lower alkyl or alkenyl radical $R_1$ represents, for example, methyl, ethyl, n- or i-propyl, butyl, -pentyl, -hexyl or -heptyl; vinyl, allyl, methallyl, 3-butenyl or 1-pentenyl. The term "lower," referred to above and hereinafter in connection with organic radicals or compounds respectively, defines such with up to 7, preferably up to 4, carbon atoms.

The cycloalkyl or cycloalkenyl radical $R_2$ is preferably 3 to 7 ring membered and unsubstituted or substituted by up to 4 lower alkyls, such as cyclopropyl, 1- or 2-methyl-cyclopropyl, 1,2-,2,2- or 2,3-dimethyl-cyclopropyl, 1,2,2- or 1,2,3-trimethyl-cyclopropyl or 2,2,3,3-tetramethyl-cyclopropyl, cyclobutyl, 3,3-dimethyl-cyclobutyl or 2,2,3-trimethyl-cyclobutyl, cyclopentyl, 2- or 3-methyl-cyclopentyl, 2,5- or 3,4-dimethyl-cyclopentyl, cyclohexyl, 2-, 3- or 4-methyl-cyclohexyl, 2,3-, 2,4- or 3,5-dimethyl-cyclohexyl or 2,4,6-trimethyl-cyclohexyl or cycloheptyl; 2-cyclopropenyl, 2,3-dimethyl-2-cyclopropenyl, 1-, 2- or 3-cyclopentenyl or -cyclohexenyl, 2- or 3-methyl-2-cyclopentenyl, 3,4-dimethyl-3-cyclopentenyl or 2-, 3- or 4-methyl-1- or 2-cyclohexenyl. A cycloalkyl-lower alkyl or cycloalkenyl-lower alkyl radical $R_2$ is one of the above-mentioned lower alkyl groups, preferably such with up to 4 carbon atoms, having in any position thereof, preferably at the terminal carbon atom, one of said cycloalkyl or cycloalkenyl radicals attached, e.g., cyclopropylmethyl, 2-cyclopentylethyl or 3-cyclopentenylmethyl.

The radical $R_3$ represents, for example, lower alkyl or alkenyl, e.g., methyl, ethyl, n- or i-propyl or -butyl; vinyl or allyl, one of the cycloalkyl, cycloalkenyl, cycloalkyl-lower alkyl or cycloalkenyl-lower alkyl radicals exemplified for $R_2$ above, aralkyl or aryl, e.g., $R_4$-phenyl-lower alkyl or $R_4$-phenyl, wherein $R_4$ is hydrogen, lower alkyl, lower alkoxy, halogeno, trifluoromethyl or amino, e.g., methyl, ethyl, n- or i-propyl or butyl; methoxy, ethoxy n- or i-propoxy or -butoxy; fluoro, chloro or bromo; $R_3$ also is free or esterified hydroxy, such as halogeno or lower alkanoyloxy, e.g., acetoxy, propionyloxy or pivalyloxy, free or etherified mercapto, such as lower alkylmercapto, e.g., methylmercapto or ethylmercapto, trifluoromethyl, nitro, amino, lower alkanoyl, e.g., acetyl or propionyl, carboxy, sulfo, carbo-lower alkoxy, e.g. carbomethoxy or carbethoxy, lower alkylsulfonyl, carbamoyl, sulfamoyl, cyano, lower alkylcarbamoyl, lower alkylsulfamoyl, di-lower alkylcarbamoyl or di-lower alkylsulfamoyl, such a N-methyl- or N,N-dimethylcarbamoyl or -sulfamoyl. $R_3$ also is hydrogen in those compounds in which Ph is substituted as shown below.

The 1,4-phenylene radical Ph is unsubstituted or substituted in the remaining 4 positions by one or more than one, preferably one or two, of the same or different substituents listed for $R_3$ and $R_4$ above. More particularly, the phenylene radical Ph represents $R_1$-1,4-phenylene, 5 to 7 ring-membered (cycloalkyl)-1,4-phenylene or (cycloalkenyl)-1,4-phenylene, in which the additional substituent preferably is in 3-position. In the compounds of Formula I, wherein Ph is (lower alkyl)-1,4-phenylene, (lower alkoxy)-1,4-phenylene, (halogeno)-1,4-phenylene, (trifluoromethyl)-1,4-phenylene, (amino)-1,4-phenylene, (cycloalkyl)-1,4-phenylene or (cycloalkenyl)-1,4-phenylene, $R_3$ is preferably hydrogen and the remaining substituent preferably is attached to the 3-position.

Functional derivatives of the acids of Formula I are preferably their esters, for example, their lower alkyl, lower alkenyl, cycloalkyl, cycloalkenyl, cycloalkyl-lower alkyl or cyclo-alkenyl-lower alkyl, aryl or aralkyl esters, e.g., the $R_4$-phenyl or $R_4$-phenyl-lower alkyl esters, free or etherified hydroxy-lower alkyl, e.g., lower alkoxy- or cycloalkoxy-lower alkyl or tert. amino-lower alkyl esters, of which the esterifying moiety has been exemplified above and, if it contains hetero atoms, these are separated from each other or the carboxy oxygen by at least 2 carbon atoms, preferably by 2 or 3 carbon atoms. A tertiary amino group therein is above all di-lower alkylamino, e.g., dimethylamino or diethylamino, also lower alkyleneimino, e.g., pyrrolidino or piperidino, or monoaza-, monooxa- or monothia-lower alkyleneimino, such as piperazino, 4-lower alkyl-piperazino, e.g., 4-(methyl or ethyl)-piperazino, morpholino or thiamorpholino. Other functional derivatives of the acids of Formula I are, for example, unsubstituted or substituted amides or thioamides, e.g., mono- or di-lower alkylamides, $R_4$-phenylamides, $R_4$-phenyl-lower alkylamides, monocyclic lower alkyleneamides, monoaza-, monooxa- or monothia-lower alkyleneamides of N-lower alkyl-monoaza-lower alkyleneadmides, the corresponding thioamides, hydroxamic acids, nitriles, ammonium or metal salts. Functional derivatives are also those of amino compounds, such as lower alkyl- or $R_4$-phenyl-lower alkyl quaternaries, acyl derivatives, e.g., lower alkanoyl, such as acetyl, propionyl or pivaloyl derivatives and acid addition salts.

The compounds of the invention possess valuable pharmacological properties. For example, they exhibit anti-inflammatory effects, as can be demonstrated in animal tests, using advantageously mammals, such as rats, as test objects. Such tests can be performed, for example, according to winter, et al., Proc. Soc. Exp. Biol. and Med. 111, 544 (1962). According to it, the compounds of the invention are applied, in the form of aqueous solutions or suspensions, which may contain carboxymethylcellulose or polyethylene glycol as solubilizers, by stomach tube to male and female mature rats, in the dosage range between about 0.1 and 75 mg/kg/day, preferably between about 0.5 and 50 mg/kg/day, advantageously between about 1 and 25 mg/kg/day. About 1 hour later 0.06 ml of a 1% aqueous saline suspension of carrageenin is injected into the rat's left hind paw and 3-4 hours subsequently any anti-inflammatory activity can be expressed by the difference of the volume and/or weight of the edematous left paw and that of the right paw, as compared with said difference estimated from untreated control animals. According to the adjuvant arthritis test, male rats are sensitized with 0.05 ml of said 1% carrageenin suspension, applied under ether anesthesia to all four paws. After 24 hours 0.1 ml of a 1% suspension of M. butyricum is injected intradermally into the tail and 7 days later the compounds of the invention are applied as shown above for a 14 day period. The rats are weighed once weekly and the secondary arthritic lesions scored 3 times a week as to number and severity. The results obtained are compared with those of untreated arthritic rats. In view of the test results obtained, the compounds of the invention are useful anti-inflammatory agents in the treatment or management of arthritic and dermatopathologic conditions. They are also useful intermediates in the preparation of other valuable products, preferably or pharmacologically active compounds, e.g., those claimed in copending application Ser. No. 843,244, filed July 18, 1969.

Particularly useful are the compounds of Formula I, in which $R_1$ is hydrogen, $R_2$ is 3 to 7 ring-membered cycloalkyl or 3 to 4 ring-membered cycloalkyl-lower alkyl, $R_3$ is lower alkyl, 3 to 7 ring-membered cycloalkyl or 5 to 7 ring-membered cycloalkenyl, $R_4$-phenyl-lower alkyl, $R_4$-phenyl, halogeno, trifluoromethyl or nitro, wherein $R_4$ is hydrogen, lower alkyl, lower alkoxy, halogeno, trifluoromethyl or amino and Ph is $R_4$-1,4-phenylene, or $R_3$ is hydrogen and Ph is (lower alkyl)-1,4-phenylene, (lower alkoxy)-1,4-phenylene, (halogeno)-1,4-phenylene, (trifluoromethyl)-1,4-phenylene or (amino)-1,4-phenylene, as well as those of Formula I, in which both $R_1$ and $R_2$ have the meaning given in this paragraph, $R_3$ is hydrogen and Ph is 5 to 7 ring-membered (cycloalkyl)-1,4-phenylene or (cycloalkenyl)-1,4-phenylene, the lower alkyl esters, the amide, the mono- or di-lower alkylamides and the ammonium, alkali metal or alkaline earth metal salts thereof.

Preferred compounds of the invention are those of Formula II

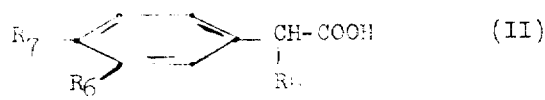
(II)

in which $R_5$ is 3 or 4 ring-membered cycloalkyl or cycloalkyl-lower alkyl, $R_6$ is hydrogen, lower alkyl, lower alkoxy, halogeno, trifluoromethyl or amino and $R_7$ is (a) lower alkyl or 5 to 6 ring-membered cycloalkyl or (b) 1-cycloalkenyl, or (c) $R_4$-phenyl or (d) halogeno or trifluoromethyl, or the lower alkyl esters, ammonium or alkali metal salts thereof.

Especially valuable are compounds of the Formula II, in which $R_5$ is cyclopropyl, cyclobutyl or cyclopropylmethyl, $R_6$ is hydrogen, methyl, chloro or amino and $R_7$ is (a) methyl, ethyl, n-or i-propyl or -butyl, cyclopentyl, cyclohexyl, (b) 1-cyclohexenyl, (c) phenyl, or (d) fluorine, chlorine or bromine, or ammonium or alkali metal salts thereof.

The compounds of this invention are prepared according to methods known per se. For example, they are obtained by:

a. converting in a compound of the Formula III

(III)

in which $X_1$ is substituent capable of being converted into the free or functionally converted

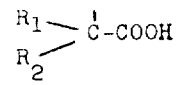

moiety, $X_1$ into said moiety or b. converting in a compound of the Formula IV

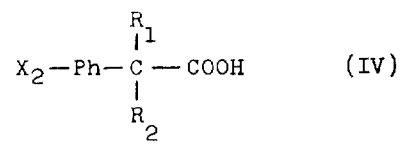

or a functional derivative thereof, in which $X_2$ is a substituent capable of being converted into $R_3$, $X_2$ into $R_3$ and, if desired, converting any resulting compound into another compound of the invention.

According to process (a), the compounds of the invention are prepared either by α introduction of the whole free or functionally converted acid moiety

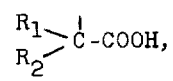

or any part thereof (preferably the carboxylic function), into compounds of Formula III, or by β) liberation of said acid moiety from a suitable group containing already the required number of carbon atoms, i.e., the liberation of a potential carboxy or alkylidene moiety.

Accordingly, the simplest substituent $X_1$ is a hydrogen atom, a metallic group or a reactively esterified hydroxy group. The former is, for example, an alkali metal, e.g., a lithium atom or a substituted alkaline earth metal, zinc or cadmium atom, such as halomagnesium or lower alkyl zinc or cadmium, e.g., chloro-, bromo-or iodomagnesium, methyl or ethyl zinc or cadmium. A reactively esterified hydroxy group is preferably such derived from a strong mineral or sulfonic acid, such as a hydrohalic, sulfuric, lower alkane or benzene sulfonic acid, e.g., hydrochloric, hydrobromic, methane-, ethane, benzene- or p-toluenesulfonic acid. The corresponding starting material of Formula III is reacted with the acid having the formula

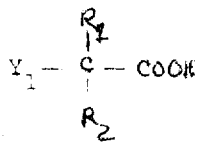

or a suitable derivative, e.g., a corresponding salt, ester, amide, or nitrile thereof, in which formulae one of $X_1$ and $Y_1$ is the above-described metallic group and the other said reactively esterified hydroxy group, or $X_1$ is hydrogen and $Y_1$ is a free or reactively esterified hydroxy group. Such reaction is performed according to the classical Grignard or Friedel-Crafts syntheses, in which a new carbon-carbon bond is formed from separate reactants. The latter synthesis is performed in the presence of a Lewis acid, such as an aluminum, boron, antimony V, ferric or zinc salt, e.g., the chlorides thereof, or hydrofuoric, sulfuric or preferably polyphosphoric acid, which latter agent is advantageously used with the above glycolic acids or their derivatives, i.e., those in which $Y_1$ is hydroxy. In case $X_1$ is a hydrogen atom and Ph contains a free or functionally converted γ-carboxy-2-alkenyloxy group in the ortho or para position thereto, such allyl ether starting material, e.g. that of the formula

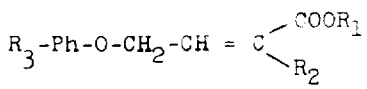

can be rearranged according to the Claisen (Cope) rearrangement procedure, for example, by heating said ether up to about 300° or less, to yield compounds of Formula I in which $R_1$ is lower alkenyl and Ph contains a hydroxy group ortho or para to the acid moiety, or functional acid derivatives, e.g., esters or lactones, thereof.

The substituent $X_1$ in Formula III is also the group

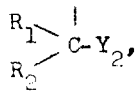

in which $Y_2$ is a metallic group, e.g., such mentioned above, an ammonium group, such as tri-lower alkylammonium or di-lower alkyl-aralkylammonium, e.g., trimethylammonium or dimethylbenzylammonium, or a free or reactively converted, such as esterified, etherified or salified, hydroxy group, e.g. such esterified as mentioned above, or etherified with a lower alkanol or aralkanol, or salified with an alkali or alkaline earth metal, e.g. sodium, potassium or calcium. Such metal compound, ester, ether or alcoholate of Formula III is reacted with a reactive derivative of carbonic or formic acid, whereby both reactants at most contain one metal atom. The metal or Grignard compound can be reacted with any suitable, metal free carbonic or formic acid derivative, advantageously carbon dioxide or disulfide, but also a corresponding carbonate or haloformate, e.g., diethyl carbonate or thiocarbonate; ethyl or propyl orthocarbonate; ethyl, tert. butyl, allyl, 2-methoxyethyl, 3-chloropropyl, phenyl or benzyl chloroformate; cyanogen or carbamoyl halides, e.g., cyanogen bromide or diethylcarbamoyl chloride. The starting material, in which $Y_2$ is an ammonium or free or reactively converted hydroxy group, is advantageously reacted with a metal cyanide, e.g., sodium or potassium cyanide, and that in which $Y_2$ is free, esterified or salified hydroxy, or the dehydrated unsaturated derivative thereof (wherein $X_1$ is a corresponding 1-alkenyl group), can also be reacted with carbon monoxide. The latter may be applied under neutral, basic or acidic conditions respectively, e.g., in the presence of sulfuric acid, under high pressure and/or temperature, e.g., up to 400° at and 300°, advantageously in the presence of heavy metal catalysts, e.g., nickel or cobalt salts or carbonyl derivatives thereof. The carbon monoxide may also be generated from appropriate sources, such as formic acid and high boiling mineral acids, e.g. sulfuric or phosphoric acid.

Another substituent $X_1$ is the group

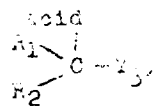

wherein $Y_3$ is a substituent convertible into a free or functionally converted carboxy group. The conversion of $Y_3$ into the latter group can be performed either by oxidation or rearrangement. In the former case $Y_3$ is, for example, methyl, hydroxymethyl, borylmethyl, hydroxyiminomethyl, formyl, lower 1-alkenyl or 1-alkynyl, lower 1,2-dihydroxyalkyl or acyl, such as lower alkanoyl, alkenyl, free or esterified carboxycarbonyl. In the corresponding starting material of Formula III, containing said potential carboxy function, $Y_3$ is transformed into free or functionally converted carboxy according to standard oxidation methods, for example, with the use of air or pure oxygen, preferably in the presence of catalysts, such as silver, manganese, iron or cobalt catalysts, or with oxidation agents, e.g., hydrogen peroxide or nitric oxides, oxidizing acids or their salts, such as hypohalous, periodic, nitric or percarboxylic acids or suitable salts thereof, e.g., sodium hypochlorite or periodate, peracetic, perbenzoic or monoperphthalic acid, heavy metal salts or oxides, such as alkali metal chromates or permanganates; chromic or cupric salts, e.g., halides or sulfates thereof, or silver, mercuric, vanadium V, chromium VI or manganese Iv oxide, in acidic or alkaline media respectively. In said oxidations, usually the free carboxylic acids of Formula I, or salts thereof, are obtained. However, by subjecting, for example, a hydroxyiminomethyl compound (oxime) to Beckmann rearrangement, e.g. treatment with sulfuric acid, p-toluenesulfonyl chloride or phosphorus pentachloride, or to oxidation, e.g., with hydrogen peroxide or any of said percarboxylic acids, or reacting the corresponding formyl or acyl compound (aldehyde or ketone) with hydrazoic acid according to the Schmidt reaction, e.g. in the presence of sulfuric acid, or the aldehyde with a sulfonyl- or nitro-hydroxamate, a nitrile, amide or hydroxamic acid will be formed respectively. A starting material in which $Y_3$ is free or esterified carboxycarbonyl, e.g. lower carbalkoxycarbonyl, can be converted into the acid of Formula I either by oxidation, e.g. with hydrogen perioxide in acidic media, such as mineral acids, or by decarbonylation, which preferably is carried out by pyrolysis, advantageously in the presence of copper or glass powder.

Finally, the substituent $X_1$ in Formula III may be such a moiety, which primarily is capable of liberating the required alkylidene group

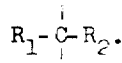

Such moiety is, for example, the free or functionally converted group

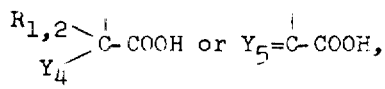

wherein each of $Y_4$ or $Y_5$ are convertible into $R_1$ and/or $R_2$ respectively, for example, by substitution, reduction, decarboxylation, deacylation or desulfurization. For example, $Y_4$ is a metal atom, a lower alkenyl or free or reactively esterified or etherified hydroxy or mercapto group, such as lithium, sodium or potassium; vinyl, allyl, hydroxy, mercapto, chloro, bromo, iodo, benzyloxy or benzylmercapto respectively, and $Y_5$ a lower alkylidene, cycloalkylidene, cycloalkyl-alkylidene, oxo or thiono group. The corresponding starting material in which $Y_4$ is a metal atom, can be reacted with a reactive ester of $R_2$—OH, e.g. such mentioned above, whereas in the products in which $Y_4$ is lower alkenyl, preferably 1-lower alkenyl, said moiety can be converted, for example into a cyclopropyl group, e.g., according to Simmons-Smith, by reaction with iodomethylmercuric or zinc iodide or an aliphatic diazo compound. The remaining starting material listed above can be reduced either with catalytically activated or nascent hydrogen, such as hydrogen in the presence of nickel, palladium or platinum catalysts, or with hydrogen generated by electrolysis or the action of metals on acids, alkalis or alcohols, such as zinc, amalgamated zinc, iron or tin on aqueous mineral or carboxylic acids, e.g., hydrochloric or acetic acid, zinc or aluminum-nickel alloys on aqueous alkali metal hydroxides, or sodium, potassium or their amalgams on lower alkanols. Also reducing and/or desulfurizing agents may be applied, depending on the starting material chosen. In case $Y_4$ is hydroxy, the reducing agent may be an aqueous suspension of phosphorus and iodine, hydriodic acid, stannous chloride or sodium sulfite or dithionite, or in case $Y_4$ is esterified hydroxy, e.g., halogeno, an aliphatic or cycloaliphatic metal compound, e.g., a corresponding $R_1$ or $R_2$ lithium or Grignard compound may be used as reducing agent. The latter metal compounds may also be applied in the reduction of said quinonmethides. In case $Y_5$ is oxo, the Clemmensen, Wolff-Kishner or Huang-Minlon procedures may be applied, wherein nascent hydrogen or hydrazine are used, the latter advantageously in the presence of strong alkalis, e.g., high boiling aqueous or glycolic sodium or potassium hydroxide solutions. In the reduction of mercapto, free or ketalized thiono compounds, desulfurization agents are advantageously applied, such as mercury or copper oxide or Raney nickel. In case $Y_4$ represents carboxy, the corresponding malonic acid derivative is decarboxylated by pyrolysis, advantageously in acidic media, or $Y_4$ stands for another acyl radical, such as lower alkanoyl or aralkanoyl, e.g., acetyl or benzoyl, the β-keto acid is subjected to acid splitting by the action of strong alkalis, e.g., those mentioned above.

Another substituent $X_1$, also providing said alkylidene group, are the following groups:

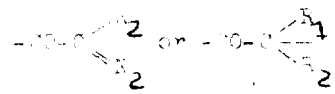

halogen. The corresponding starting material is converted into the compounds of the invention according to the Wolff (Arndt-Eistert) reaction, e.g., by hydrolysis, alcoholysis, ammonolysis or aminolysis of corresponding α-diazo-ketones, advantageously while irradiated or heated in the presence of copper or silver catalysts, or according to the Favorskii (Wallach) reaction respectively, e.g., by the action of strong alkalis or soluble silver salts, such as silver nitrate, on corresponding α-haloketones.

The substituent $X_2$ is, for example, a hydrogen atom, which can be replaced by a halogen atom, a nitro or acyl group, according to standard halogenation, nitration and acylation procedures, which advantageously are carried out at low temperatures. For example, halogens may be applied in the presence of Lewis acids, e.g., ferric, aluminum, antimony III or tin IV halides, or halogenation agents may be used, e.g., hydrochloric acid and hydrogen peroxide or sodium chlorate, nitrosyl chloride or bromide, bromosuccin- or phthalimide. Furthermore, nitration may be applied advantageously with the use of nitric acid or nitrates under acidic condition, e.g., in the presence of sulfuric or trifluoroacetic acid respectively or acylation with an acyl halide according to Friedel-Crafts in the presence of Lewis acids, e.g., aluminum chloride, or with a sulfonyl halide. $X_2$ can also be a diazonium group, which can be replaced according to the Sandmeyer or Gomberg-Bachmann-Hey reactions into the corresponding hydroxy, halogeno, cyano, alkoxy or alkylmercapto compounds, e.g., by hydrolyzing the diazonium salt at elevated temperatures, heating its halide or tetrafluoroborate or reacting it with cuprous halides or cyanide, or with a lower alkanol, alkylmercaptan an $R_4$-benzene, respectively, preferably under netural or slightly acidic or alkaline conditions, e.g., in the presence of sodium hydroxide or acetate.

The compounds of the invention so obtained can be converted into each other according to methods known per se. For example, resulting free acids may be esterified with the corresponding alcohols in the presence of a strong acid, e.g., hydrochloric, sulfuric, benzene or p-toluene sulfonic acid, or with diazo compounds, or converted into their halides by treatment with thionyl halides or phosphorus halides or oxyhalides. Resulting esters may be hydrolyzed or transesterified in the presence of acidic or alkaline agents, e.g., mineral or complex heavy metal acids or alkali metal carbonates or alcoholates, or treated with ammonia or corresponding amines. Resulting acid halides may be treated with alcohols, ammonia or amines and resulting metal or ammonium salts with aliphatic or araliphatic halides or chlorosulfites, thionyl halides, phosphorus oxide, halides or oxyhalides or other acyl halides, in order to obtain the corresponding esters, halides, anhydrides, amides or the nitrile respectively. Resulting amides or thioamides can be hydrolyzed under acidic or alkaline conditions, e.g., with the use of aqueous mineral and/or carboxylic acids or alkali metal hydroxides, also alcoholyzed, transaminated or desulfurized, e.g., with the use of mercuric oxide or alkyl halides followed by hydrolysis. Resulting nitriles likewise can be hydrolyzed or alcoholyzed, e.g., with the use of concentrated aqueous or alcoholic acids or alkalis or alkaline hydrogen peroxide. A resulting ester, salt or nitrile, containing in $\alpha$-position at least one hydrogen atom, can be metallized therein, e.g., with the use of alkali metals or their derivatives, such as phenyl lithium, triphenylmentyl sodium or sodium hydride, amides or alcoholates, and thereupon reacted with reactive esters of $R_1$—OH. Resulting compounds may also be halogenated, nitrated or acylated in the Ph-moiety as shown for the conversion of $X_2$, so halogenated in aliphatic moieites with haloimines, e.g., N-bromosuccinimide, if desired dehydrohalogenated with alkalies, in order to introduce a double bond into $R_2$ and/or $R_3$. Resulting nitro compounds may be reduced, for example, with catalytically activated or nascent hydrogen and, if desired, the prim. amines obtained, either treated with reactive esters of corresponding alcohols or glycols, or with reactive functional acid derivatives, in order to obtain sec., tert., quat. or acylated amino compounds respectively. In resulting phenolic products, the hydroxy or mercapto group can be etherified, e.g., by reacting the corresponding alkali metal phenolates with lower alkyl or cycloalkyl halides or sulfonates, or resulting phenol ethers are hydrolyzed, e.g., with the use of strong acids or acidic salts, e.g., hydrobromic and acetic acid or pyridine hydrochloride. Finally, resulting unsaturated compounds can be hydrogenerated as described above, e.g., with catalytically activated or nascent hydrogen, in order to eliminate double bonds, e.g. in the $R_1$, $R_2$ or $R_3$ moiety.

A resulting compound can be converted into its salts according to conventional methods, by reacting it with a suitable salt-forming reagent. Thus, an acid, for example, with ammonia, an amine or an alkali or alkaline earth metal hydroxide, carbonate or hydrogen carbonate. A salt of this type, or a basic compound, can be converted into the free compound or a corresponding acid addition salt respectively, by reacting it with an acid until the proper pH has been reached. Preferred is a therapeutically useful acid, or with a corresponding anion exchange preparation, and isolating the desired salt. An acid addition salt may be converted into the free compound by treatment with a base, e.g., a metal hydroxide, ammonia or a hydroxyl ion exchange preparation. Therapeutically useful acids are, for example, inorganic acids, e.g., hydrochloric, hydrobromic, sulfuric, phosphoric, nitric or perchloric acid, or organic acids, e.g., carboxylic or sulfonic acids, such as formic, acetic, propionic, succinic, glycollic, lactic, malic, tartaric, citric, ascorbic, maleic, hydroxymaleic, pyroracemic, phenylacetic, benzoic, 4-amino-benzoic, anthranilic, 4-hydroxybenzoic, salicylic, aminosalicylic, embonic, nicotinic, methanesulfonic, ethanesulfonic, hydroxy-ethanesulfonic, ethylenesulfonic, benzenesulfonic, halogenbenzenesulfonic, toluenesulfonic, naphthalenesulfonic and sulfanilic acid; methionine, tryptophan, lysine and arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g. by fractional distillation, crystallization and/or chromatography. Racemic products can likewise be resolved into the optical antipodes, for example by separation of diastereomeric salts thereof, e.g. by the fractional crystallization of d- or l-tartrates or d-$\alpha$-(l-naphthyl)-ethylamine or l-cinchonidine salts.

The above reactions are carried out according to standard methods, in the presence or absence of diluents, preferably such as are inert to the reagents and are solvents thereof, of catalysts, condensing or neutralizing agents and/or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out, or the process is discontinued at any stage thereof, or in which the starting material is formed under the reaction conditions or is used in the form of its salts or reactive derivatives. For example, in most of the above-described oxidation methods, wherein $Y_3$ is converted into a free or functionally converted carboxy group, the corresponding aldehydes ($Y_3$ is formyl) are formed intermediarily. According to the haloform reaction ($Y_3$ is acetyl) intermediarily formed trihaloketones are hydrolyzed under the applied alkaline conditions, to yield the corresponding salts or esters of the acids of Formula I. The $\alpha$-diazoketones are usually formed, according to Arndt-Eistert, from the corresponding benzoic acid halides and aliphatic or cycloaliphatic ($R_2$) diazo compounds, whereupon the above-described Wolff rearrangement is performed. In the process of the invention, those starting materials are advantageously selected, which yield the above-described preferred embodiments of the invention, e.g., the compounds corresponding to Formula II.

The starting material used is known or, if new, may be prepared according to the methods described for known analogs thereof. For example, compounds of Formula III can be prepared analogous to the process mentioned under item b), i.e., by introduction or construction of $R_3$. In case $X_1$ is a reactively esterified hydroxy group, it may also be introduced either by halogenation, or nitration followed by reduction, diazotization and Sandmeyer reaction. The resulting starting material may be subsequently converted into the metallic compounds, e.g., by reaction with alkali or alkaline earth metals, such as lithium or magnesium, or with dialkyl zinc or cadmium. The allyl ethers for the Claisen rearrangement can be prepared analogous to those described in J. Chem. Soc. 4210 (1963).

The starting material in which $Y_2$ is a metallic group may be prepared as shown above, i.e., by reacting reactive esters of the corresponding benzylalcohols with alkali or alkaline earth metals or dialkyl zinc or cadmium. Otherwise, according to Friedel-Crafts, easily obtainable linear or cyclic alkano- or alkenophenones $R_3$—Ph—CO—$R_2$ may be reduced either with lithium aluminum hydride or with $R_1$-magnesium halides, or $R_3$—Ph—Grignard compounds reacted with $R_1$—CO—$R_2$, to yield the corresponding benzyl alcohols, whose hydroxy group may be reactively esterified or salified according to well-known methods, e.g., by reaction with phosphorus, thionyl or sulfonyl halides, alkali or alkaline earth metals respectively and the resulting esters or salts may be converted into ethers either by reaction with alcoholates or reactive esters respectively. The compounds in which $Y_2$ is an ammonium group, can be obtained from the former reactive esters and secondary amines and the resulting tertiary amines are quaternized in the usual manner, e.g., by reaction with lower alkyl or aralkyl halides.

The starting material containing $Y_3$ can be obtained from the former compounds in which $Y_2$ is a metallic group, by reacting them with a methyl halide, formaldehyde, a formyl halide, lower alkanal, alkenal or hydroxyalkanal or a lower alkanoyl, alkenoyl or oxalyl halide respectively and, if desired, dehydrating resulting alcohols by the action of acidic agents, e.g., sulfuric acid or phosphorus pentoxide, to yield unsaturated derivatives thereof. The latter, e.g. methylidene compounds, may be reacted with boranes in order to obtain borylmethyl compounds and aldehydes with hydroxylamine, to yield the hydroxyiminomethyl compounds (oximes). The aldehydes, i.e. compounds in which $Y_3$ is formyl, can also be obtained from said ketones $R_3$—Ph—CO—$R_2$ by reaction with dimethylsulfoniummethylide or dimethyloxysulfoniummethylide (generated from the corresponding trimethylsulfonium salts) and rearranging the resulting ethyleneoxides to the corresponding aldehydes by the action of Lewis acids, e.g., p-toluene sulfonic acid or boron trifluoride, or according to the Darzens condensation by reacting the above ketones with α-halo-alkanoic or alkenoic acid esters in the presence of alcoholates, e.g., potassium tert. butoxide, saponifying the glycidic esters formed and rearranging and decarboxylating them, advantageously in acidic media, e.g., sulfuric acid.

The starting material containing $Y_4$, which represents free, esterified or etherified hydroxy or mercapto, can be prepared according to the cyanohydrin or analog syntheses, e.g. by reaction of compounds $R_3$—Ph—CO—$R_2$ or their thiono analogs, with aqueous potassium cyanide under acidic conditions and, if desired, converting resulting nitriles into other acid derivatives and/or alcohols into corresponding mercapto compounds or reactive esters or ethers thereof, or dehydrating them to unsaturated derivatives. The compounds in which $Y_5$ is oxo or thiono can be obtained according to Friedel-Crafts with the use of suitable $R_3$—Ph—H compounds and oxalyl halides. The resulting phenylglyoxylic acid esters may then be reduced with $R_2$-Grignard compounds, if desired, followed by dehydration. Said compounds may also be prepared according to the Ando synthesis by reaction with mesoxalates in the presence of stannic chloride. The resulting adduct can either be hydrogenated, the malonate formed metallized and reacted with a reactive ester of $R_2$—OH or saponified and decarboxylated.

Finally the α-diazoketones are obtained from corresponding benzoic acid halides and $R_2$-diazo compounds and the α-haloketones by halogenating of the corresponding alkanophenones or reacting the former α-diazoketones with hydrohalic acids. The starting material of Formula IV is prepared analogous to the process mentioned under item (a), by selecting starting materials containing $X_2$ or a group capable of being converted into $X_2$, advantageously nitro, instead of another $R_3$.

The pharmacologically active compounds of the invention are useful in the manufacture of pharmaceutical compositions containing an effective amount thereof in conjunction or admixture with excipients suitable for either enteral, parenteral or topical application. Preferred are tablets and gelatin capsules, comprising the active ingredient together with (a) diluents, e.g., lactose, dextrose, sucrose, mannitol, sorbitol, cellulose and/or glycine, (b) lubricants, e.g., silica, talcum, stearic acid, its magnesium or calcium salt and/or polyethyleneglycol, for tablets also (c) binders, e.g., magnesium aluminum silicate, starch paste, gelatin, tragacanth, methylcellulose, sodium carboxymethylcellulose and/or polyvinylpyrrolidone, if desired, (d) disintegrants, e.g., starches, agar, alginic acid or its sodium salt, enzymes of the binders or effervescent mixtures and/or (e) adsorbents, colorants, flavors and sweeteners. Injectable compositions are preferably aqueous isotonic solutions or suepensions, and suppositories or ointments are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75%, preferably about 1 to 50% of the active ingredient.

The following examples are intended to illustrate the invention and are not to be construed as being limitations thereon. Temperatures are given in degrees Centigrade, and all parts wherever given are parts by weight.

EXAMPLE 1

To the suspension, prepared from 33.4 g silver nitrate, 210 ml water and 20 g sodium hydroxide, the mixture of 25 g α-cyclopropyl-α(4-cyclohexyl-phenyl)-acetaldehyde and 3 ml ethanol is added during 2 hours at 0°–5° and the whole is stirred overnight at room temperature. The mixture is filtered, the residue washed with water and the filtrate with diethyl ether. The aqueous layer is separated, acidified with concentrated hydrochloric acid and the mixture extracted with diethyl ether. The extract is washed with water until neutral, dried, filtered and evaporated in vacuo. The residue is recrystallized from hexane, to yield the α-cyclopropyl-α-(4-cyclohexyl-phenyl)-acetic acid of the formula

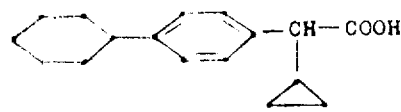

melting at 154°–156°.

The starting material is prepared as follows: To the mixture of 22.8 g 4-cyclohexyl-phenyl cyclopropyl ketone, 19.6 g ethyl chloroacetate, 50 ml benzene and 20 ml tert. butanol, the solution of 18 g potassium tert butoxide in 130 ml tert. butanol is added during 1.5 hours at 0°–5° while stirring, and stirring is continued for 25 hours at room temperature. The mixture is evaporated in vacuo, the residue taken up in 100 ml water and 100 ml diethyl ether, the organic solution separated and the aqueous layer extracted with diethyl ether. The combined organic solutions are washed with saturated aqueous sodium bicarbonate, water and brine, dried, filtered and evaporated in vacuo, to yield the ethyl β-cyclopropyl-β-(4-cyclohexyl-phenyl)-glycidate.

To 36 g thereof, the mixture of 353 ml methanol, 1.8 ml water and 39 g potassium hydroxide is added at 0°–50°5°and the whole is stirred overnight at room temperature. The mixture is evaporated in vacuo, the residue taken up in 50 ml water, the solution acidified with 10% aqueous sulfuric acid and extracted with diethyl ether. The extract is washed with water until neutral, dried, filtered, and evaporated in vacuo, to yield the α-cyclopropyl-α-(4-cyclohexyl-phenyl)-acetaldehyde, which is used as such without further purification.

EXAMPLE 2

To the suspension, prepared from 8.35 g silver nitrate, 53 ml water and 5 g sodium hydroxide, 5.4 g α-cyclopropyl-α-(4-sec.butyl-phenyl)-acetaldehyde are added at 0°–5° during 2 hours while stirring. The mixture is stirred at room temperature overnight, filtered and the residue washed with water. The filtrate is washed with diethyl ether, the aqueous layer acidified with concentrated hydrochloric acid and extracted with diethyl ether. The extract is washed with water until neutral, dried, filtered and evaporated. The residue is distilled and the fraction boiling at 60°–70°/0.02 mm Hg collected; it represents the α-cyclopropyl-α-(4-sec.butyl-phenyl)-acetic acid of the formula

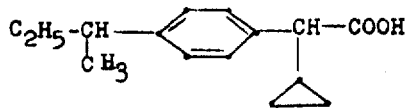

melting at 68°–74°.

The starting material is prepared as follows: 17.2 g 4-sec.butylphenyl cyclopropyl ketone are added to the suspension, prepared from 2.4 g sodium hydride, 22 g trimethyloxysulfonium iodide and 100 ml dimethylsulfoxide, and the mixture is stirred at room temperature for 10 minutes and at 50° for 1 hour. It is cooled, combined with 360 ml water, and the whole extracted with diethyl ether. The extract is washed with water, dried, filtered and evaporated in vacuo. The residue is distilled and the fraction boiling at 81°–82°/0.04 mm Hg collected, to yield the 1-cyclopropyl-1-(4-sec.butyl-phenyl)-ethylene oxide.

To the solution of 5 g thereof in 52 ml benzene, 1.64 g borontrifluoride diethyl etherate are added and the mixture allowed to stand for 5 minutes at room temperature. It is poured into 200 ml ice water, the mixture stirred for 5 minutes, the organic solution separated and the aqueous layer extracted with benzene. The combined organic solutions are washed with water until neutral, dried, filtered and evaporated in vacuo, to yield the α-cyclopropyl-α-(4-sec.butyl-phenyl)-acetaldehyde.

EXAMPLE 3

To the suspension, prepared from 16 g silver nitrate, 110 ml water and 10 g sodium hydroxide, 10 g α-cyclobutyl-α-(4-fluoro-phenyl)-acetaldehyde are added slowly at 0°–5° while stirring, and stirring is continued at room temperature overnight. The mixture is filtered, the residue washed with water and the filtrate with diethyl ether. The aqueous layer is acidified with concentrated hydrochloric acid, extracted with diethyl ether, the extract washed with water until neutral, dried, filtered and evaporated in vacuo. The residue is dried over potassium hydroxide, to yield the α-cyclobutyl-α-(4-fluoro-phenyl)-acetic acid of the formula

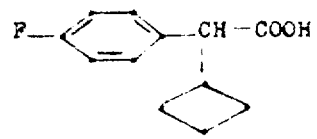

melting at 108°–109.5°.

The starting material is prepared as follows: To the mixture of 22.3 g 4-fluorophenyl cyclobutyl ketone and 24.5 g ethyl chloroacetate, the solution of 22.4 g potassium tert. butoxide in 145 ml tert. butanol is added during 1.5 hours at 0°–5° while stirring, and stirring is continued at room temperature for 2 days. The mixture is evaporated in vacuo, the residue taken up in 125 ml diethyl ether and 125 ml water, the organic solution separated and the aqueous layer extracted with diethyl ether. The combined organic solutions are washed with saturated aqueous sodium bicarbonate, water and brine, dried, filtered and evaporated in vacuo. The residue is distilled and the fraction boiling at 113°–119°/0.07 mm Hg collected, to yield the ethyl β-cyclobutyl-β-(4-fluoro-phenyl)-glycidate.

To 29.2 g thereof, the solution of 56 g potassium hydroxide in 510 ml methanol and 56 ml water is added at 0°–5° while stirring, and stirring is continued at room temperature overnight. The mixture is evaporated in vacuo, the residue taken up in 300 ml water, the solution acidified with 10% aqueous sulfuric acid and extracted with diethyl ether. The extract is washed with water until neutral, dried, filtered and evaporated. The residue is distilled and the fraction boiling at 78°–80°/0.07 mm Hg collected; it represents the α-cyclobutyl-α-(4-fluoro-phenyl)-acetaldehyde.

EXAMPLE 4

The mixture of 9.4 g chromium trioxide, 15 g concentrated sulfuric acid and water to make a total of 47 ml, is slowly added to the solution of 26 g α-cyclopropyl-α-(3-chloro-4-cyclohexylphenyl)-acetaldehyde in 160 ml acetone at −15° to −10° while stirring. The mixture is stirred for ½ hour, then allowed to come to room temperature and stirred for an additional 1½ hours. It is diluted with 500 ml ice and water, extracted with diethyl ether, which in turn is extracted with 150 ml 15% aqueous sodium hydroxide. The aqueous layer is acidified with 6N hydrochloric acid and extracted with diethyl ether. The extract is washed with water, dried, evaporated in vacuo, and the residue recrystallized from hexane, to yield the α-cyclopropyl-α-(3-chloro-4-cyclohexylphenyl)-acetic acid of the formula

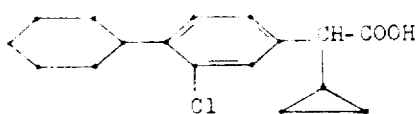

melting at 134°-136°.

The starting material is prepared as follows: The solution of 23.2 g potassium tert. butoxide in 170 ml tert. butanol is added during 2½ hours to the solution of 34 g 3-chloro-4-cyclohexylphenyl cyclopropylketone in 25.4 g ethyl chloroacetate while stirring under nitrogen at 5° to 10°. The mixture is allowed to come to room temperature and is stirred for 2 days. It is evaporated, the residue cooled in an ice bath and 150 ml diethyl ether and 150 ml cold water are added. The aqueous layer is extracted with diethyl ether and the combined organic phase washed once with water, once with 50 ml saturated aqueous sodium bicarbonate once with water and twice with brine, dried, filtered and evaporated. The residue is distilled in a short-path distilling apparatus and the fraction boiling at a bath temperature of 145° to 150°/0.01 mm Hg collected, to yield the ethyl β-cyclopropyl-β-(3-chloro-4-cyclohexylphenyl)-glycidate.

To the solution of 32 g thereof in 30 ml methanol, the cold solution of 26 g potassium hydroxide in 220 ml methanol and 1.67 ml water is added while stirring and stirring is continued for 3 hours at 5° and at room temperature overnight. The mixture is evaporated, the residue taken up in 50 ml water, the mixture acidified with cold 10% sulfuric acid and extracted twice with diethyl ether. The extract is washed with water until neutral, dried and evaporated, to yield the α-cyclopropyl-α-(3-chloro-4-cyclohexylphenyl)-acetaldehyde.

EXAMPLE 5

The solution of 3.5 g chromium trioxide, 5.6 g concentrated sulfuric acid and water to make a total of 17.5 ml, is slowly added to the solution of 10 g α-cyclopropyl-α-(3-nitro-4-cyclohexylphenyl)-acetaldehyde in 80 ml acetone at −15 to −20°. The mixture is stirred for 2 hours and allowed to stand overnight at room temperature. It is diluted with 300 ml water, extracted with diethyl ether, which in turn is extracted with an excess of 20% aqueous sodium hydroxide. The aqueous layer is acidified with 6N hydrochloric acid and extracted with diethyl ether. The extract is washed with water, dried, evaporated in vacuo and the residue recrystallized from benzene, to yield the α-cyclopropyl-α-(3-nitro-4-cyclohexylphenyl)-acetic acid of the formula

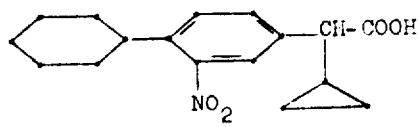

melting at 135°-136°.

The starting material is prepared as follows: 2.1 g sodium hydride are added to 50 ml anhydrous dimethylsulfoxide and the mixture heated to 60°-70° for one hour while stirring under nitrogen. It is cooled to −10°, diluted with 50 ml dry tetrahydrofuran and combined with the solution of 17.4 g trimethylsulfonium iodide in 67 ml dimethylsulfoxide as rapidly as possible, while keeping the temperature below zero. After stirring for one minute, the solution of 10 g 3-nitro-4-cyclohexylphenyl cyclopropylketone in 67 ml tetrahydrofuran is added and the mixture stirred for 5-10 minutes. It is filtered through a sintered glass funnel, the filtrate diluted with three times its volume of water and extracted with diethyl ether. The extract is washed eight times with water, once with brine, dired and evaporated in vacuo, to yield the 1-cyclopropyl-1-(3-nitro-4-cyclohexylphenyl)-ethyleneoxide. 10 g thereof are added to the solution of 0.6 g anhydrous p-toluenesulfonic acid in 200 ml benzene and the mixture refluxed for 18 hours. It is cooled, washed with aqueous sodium bicarbonate and water, dried and evaporated in vacuo, to yield the α-cyclopropyl-α-(3-nitro-4-cyclohexylphenyl)-acetaldehyde.

EXAMPLE 6

The solution of 15 g α-cyclopropyl-α-(3-nitro-4-cyclohexylphenyl)-acetic acid in 150 ml ethanol in hydrogenated over 0.5 g 10% palladium on carbon at atmospheric pressure until the theoretical amount of hydrogen has been taken up. It is filtered, the filtrate evaporated and the residue recrystallized from ethanol, to yield the α-cyclopropyl-α-(3-amino-4-cyclohexylphenyl)-acetic acid of the formula

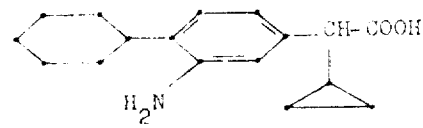

melting at 149°-151°.

EXAMPLE 7

The mixture of 4.15 g α-cyclobutyl-α-(4-fluorophenyl)-acetic acid and 25 ml thionyl chloride is heated on a steam bath for ½ hour and evaporated. To the residue 60 ml cold, concentrated aqueous ammonium hydroxide are added while stirring and heating, the precipitate formed collected and recrystallized from ethanol and benzene, to yield the α-cyclobutyl-α-(4-fluorophenyl)-acetamide of the formula

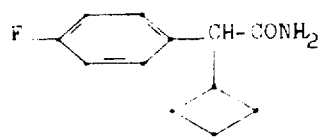

melting at 133°-134°.

EXAMPLE 8

The mixture of 5 g α-cyclopropyl-α-(4-cyclohexylphenyl acetic acid and 25 ml thionyl chloride is heated on a steam bath for ½ hour and evaporated. The residue 70 ml cold, concentrated ammonium hydroxide are added while stirring, the precipitate formed collected and recrystallized from ethanol and benzene, to yield the α-cyclopropyl-α-(4-cyclohexylphenyl)-acetamide of the formula

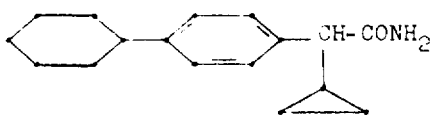

melting at 151°–153°.

EXAMPLE 9

The mixture of 5 g α-cyclopropyl-α-(4-cyclohexylphenyl)-acetic acid and 10 ml thionyl chloride is heated for ½ hour on a steam bath while stirring and evaporated in vacuo. To the residue 15 ml pyrrolidine and 70 ml benzene are added and the mixture heated for several minutes. It is filtered, the filtrate washed with water, 5% hydrochloric acid, 5% aqueous sodium hydroxide and water, dried, evaporated and the residue recrystallized from benzene, to yield the 1-[α-cyclopropyl-α-(4-cyclohexylphenyl)-acetyl]-pyrrolidine of the formula

melting at 137°–138°.

EXAMPLE 10

The mixture of 15 g α-cyclopropyl-α-(4-cyclohexylphenyl)-acetic acid, 8 ml thionyl chloride and 25 ml benzene is heated on a steam bath for 1 hour and evaporated under pressure. To the residue 15 ml morpholine are added, the mixture stirred and heated for ½ hour and diluted with water. The precipitate formed is collected and recrystallized from cyclohexane, to yield the 1-[α-cyclopropyl-α-(4-cyclohexylphenyl)-acetyl]-morpholine of the formula

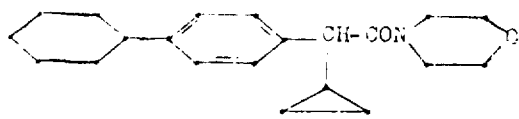

melting at 115°–117°.

EXAMPLE 11

The mixture of 4.69 g d,l-α-cyclopropyl-α-(4-cyclohexylphenyl)-acetic acid (m.p. 154°–156°), 2.20 g l (−)-α-phenylethylamine and 225 ml 66% aqueous ethanol is heated to the boil and allowed to stand in the cold. The precipitate formed is filtered off and recrystallized from aqueous ethanol, to yield the l(−)-α-phenylethylammonium α-cyclopropyl-α-(4-cyclohexylphenyl)-acetate, $[\alpha]D^{25} = -27.6°$ (methanol).

1.1 g thereof is shaken with diethyl ether, water and 5 ml N hydrochloric acid, the organic layer separated, dried and evaporated, to yield the l(−)-α-cyclopropyl-α-(4-cyclohexylphenyl)-acetic acid melting at 131°–141°.

The combined mother liquors obtained from the above salt are evaporated, the residue taken up in aqueous sodium hydroxide and the mixture washed with diethyl ether. The aqueous phase is acidified with N hydrochloric acid and extracted with diethyl ether. The extract is washed with water, dried and evaporated. 2.35 g of the residue is taken up in 112 ml 66% aqueous ethanol and 1.1 g d (+)-α-phenyl-ethylamine is added while stirring and heating. The precipitate formed after cooling is filtered off and recrystallized from aqueous ethanol, to yield the d (+)-α-phenylethyl ammonium α-cyclopropyl-α-(4-cyclohexylphenyl)-acetate, $[\alpha]D^{25} = +32.1°$ (ethanol). The corresponding d-acid prepared therefrom as shown above exhibits $[\alpha]D^{25} = +60.5°$ (ethanol).

EXAMPLE 12

In the manner described in the previous Examples, the following compounds of Formula II are prepared from equivalent amounts of the corresponding starting materials, $R_5$=cyclopropyl (recrystallized from hexane, if desired, with the aid of diethyl ether):

| $R_6$ | $R_7$ | m.p. °C |
|---|---|---|
| H | F | 61–63.5 |
| H | Cl | 80–85 |
| CH₃ | CH₃ | 106–108 |
| H | Phenyl | 97–100 |

EXAMPLE 13

Preparation of 10,000 tablets each containing 50.0 mg of the active ingredient:

| Formula: | |
|---|---|
| α-cyclopropyl-α-(4-cyclohexylphenyl)-acetic acid | 500.00 g |
| Lactose | 1,706.00 g |
| Corn Starch | 90.00 g |
| Polyethylene glycol 6,000 | 90.00 g |
| Talcum powder | 90.00 g |
| Magnesium stearate | 24.00 g |
| Purified water | q.s. |

Procedure:

All the powders are passed through a screen with openings of 0.6 mm. Then the drug substance, lactose, talcum, magnesium stearate and half of the starch are mixed in a suitable mixer. The other half of the starch is suspended in 45 ml water and the suspension added to the boiling solution of the polyethylene glycol in 180 ml water. The paste formed is added to the powders which are granulated, if necessary, with an additional amount of water. The granulate is dried overnight at 35°, broken on a screen with 1.2 mm openings and compressed into tablets using concave punches with 7.1 mm diameter, uppers bisected.

EXAMPLE 14

Preparation of 10,000 tablets each containing 10.0 mg of the active ingredient:

Formula:

| | |
|---|---|
| α-cyclopropyl-α-(3-chloro-4-cyclohexyl-phenyl)-acetic acid | 100.00 g |
| Lactose | 1,157.00 g |
| Corn Starch | 75.00 g |
| Polyethylene glycol 6,000 | 75.00 g |
| Talcum powder | 75.00 g |
| Magnesium stearate | 18.00 g |
| Purified water | q.s. |

Procedure:

All the powders are passed through a screen with openings of 0.6 mm. Then the drug substance, lactose, talcum, magnesium stearate and half of the starch are mixed in a suitable mixer. The other half of the starch is suspended in 40 ml water and the suspension added to the boiling solution of the polyethylene glycol in 150 ml water. The paste formed is added to the powders which are granulated, if necessary, with an additional amount of water. The granulate is dried overnight at 35°, broken on a screen with 1.2 mm openings and compressed into tablets using concave punches with 6.4 mm diameter, uppers bisected.

In the analogous manner, tablets can be prepared, each containing 10 to 50 mg of a compound of the invention, especially those of Formula II.

EXAMPLE 15

To the suspension of 10 g α-cyclopropyl-(3-amino-4-cyclohexylphenyl)-acetic acid and 20 ml pyridine, 3.5 ml propionyl chloride are added while stirring and cooling. The mixture is allowed to stand in the refrigerator for 2 weeks. It is poured into 120 ml ice water, the solution acidified with 6N hydrochloric acid and extracted with diethyl ether. The extract is washed with water, dried, filtered and evaporated. The residue is taken up in the minimum amount of benzene and the solution diluted with hexane until cloudy. After standing in the cold, the precipitate formed is filtered off and recrystallized from hexane and a mixture of ethyl acetate, benzene and cyclohexane (1:1:1), to yield the α-cyclopropyl-(3-propionylamino-4-cyclohexylphenyl)-acetic acid of the formula

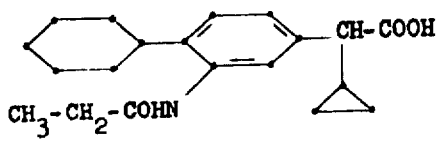

melting at 180°–182°.

EXAMPLE 16

To the solution of 200 g α-cyclopropyl-phenyl-acetic acid in 1.2 liters trifluoroacetic acid, the mixture of 73 ml 70% aqueous nitric acid and 9.1 ml 96% aqueous sulfuric acid is added dropwise while stirring and cooling to about 3°. After 1-½ hours, the temperature is allowed to rise to room temperature and the mixture stirred for a total of 3 additional hours. It is dropped onto 3.2 kg ice and 300 ml water while stirring, filtered, the residue washed with 6 liters water and dried, to yield an about 2:1 mixture of α-cyclopropyl-(4- and 2-nitrophenyl)-acetic acid. It can be separated by recrystallization from (a) n-propanol, (b) benzene and (c) benzene-cyclohexane, to yield the α-cyclopropyl-(4-nitrophenyl)-acetic acid of the formula

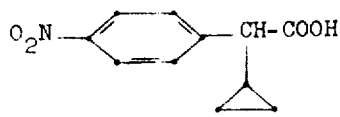

melting at 107°–109°.

EXAMPLE 17

To the solution of 10 g ethyl 4-nitrophenylacetate in 400 ml dimethyl formamide-toluene (1:1), 2.5 g 50% sodium hydride are added portionwise during 15 minutes while stirring and cooling with ice, after which the solution of 9.6 g cyclopropylmethyl bromide in 50 ml toluene is added dropwise and the mixture stirred overnight at room temperature. It is diluted with 200 ml water, extracted with diethyl ether, the extract dried, evaporated, the residue distilled and the fraction boiling at 132°–138°/0.25 mm Hg collected, to yield the ethyl α-(4-nitrophenyl)-β-cyclopropylpropionate of the formula The mixture of 1 g thereof and 20 ml of 25% aqueous sodium hydroxide is refluxed for 3 hours, cooled and diluted with water. It is acidified with hydrochloric acid, the precipitate formed filtered off and recrystallized from ethyl acetate, to yield the corresponding free acid. In the analogous manner the α-cyclopropylmethyl analogs of the previously described α-cyclopropyl compounds are prepared.

EXAMPLE 18

To the suspension, prepared from 7.14 g silver nitrate, 45 ml water and 4.2 g sodium hydroxide, 5 g α-cyclopropyl-α-(4-bromophenyl)-acetaldehyde are added during 2 hours at 0° while stirring, and stirring is continued at room temperature overnight. The mixture is filtered, the residue washed with water and the filtrate with diethyl ether. The aqueous layer is acidified with concentrated hydrochloric acid, extracted with diethyl ether, the extract washed with water until neutral, dried, filtered and evaporated in vacuo. The residue is recrystallized from hexane and sublimed in vacuo, to yield the α-cyclopropyl-α-(4-bromophenyl)-acetic acid of the formula

showing in the U. V. spectrum a $\gamma_{max}$ at 221μ ($\epsilon$=10,710).

The starting material is prepared as follows: The mixture of 100 g 4-bromophenyl cyclopropyl ketone and 87.2 g ethyl chloroacetate is added to the solution of 80 g potassium tert. butoxide in 500 ml tert. butanol during 2 hours while stirring at 0° and overnight at room temperature. The mixture is evaporated in vacuo, the residue taken up in 500 ml water and 500 ml diethyl ether, the organic solution separated and the aqueous layer extracted with diethyl ether. The combined organic solutions are washed with saturated aqueous sodium bicarbonate, water and brine, dried, filtered and evaporated in vacuo, to yield the ethyl β-cyclopropyl-β-(4-bromophenyl)-glycidate.

18 g thereof are added to the mixture of 22.6 g potassium hydroxide, 200 ml methanol and 1.04 ml water and the whole is stirred overnight at room temperature. The mixture is evaporated in vacuo, the residue taken up in 60 ml water, the solution acidified with 10% aqueous sulfuric acid and extracted with diethyl ether. The extract is washed with water until neutral, dried, filtered, evaporated, the residue distilled and the fraction boiling at 81°–98°/0.05 mm Hg collected, to yield the α-cyclopropyl-α-(4-bromophenyl)-acetaldehyde.

EXAMPLE 19

The solution of 50 g chromium trioxide and 80 g sulfuric acid in 250 ml water is slowly added to that of 9.8 g α-cyclopropyl-α-(4-methoxy-phenyl)-acetaldehyde in 110 ml acetone while stirring at −15° and overnight at 0°. The mixture is diluted with 350 ml water, extracted with diethyl ether, the extract washed with water, dried and evaporated. The residue is taken up in 120 ml diethyl ether, the solution extracted with 20% aqueous sodium hydroxide, the aqueous solution acidified with hydrochloric acid and re-extracted with diethyl ether. The extract is dried, evaporated, the residue distilled in high vacuum and the distillate recrystallized from benzene-hexane, to yield the α-cyclopropyl-α-(4-methoxy-phenyl)-acetic acid of the formula

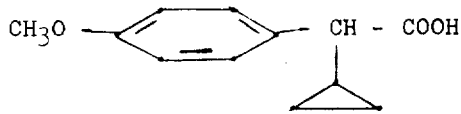

melting at 131°–132°.

The starting material is prepared as follows: The mixture of 5.75 g sodium hydride and 120 ml dimethylsulfoxide is stirred for 1 hour at 60°–70°. It is cooled to −10°, diluted with 120 ml tetrahydrofuran and combined with the solution of 49.1 g trimethylsulfonium iodide in 195 ml dimethylsulfoxide and the mixture stirred for 2 minutes. Thereupon 17.2 g 4-methoxyphenyl cyclopropyl ketone in 195 ml tetrahydrofuran are added rapidly and the mixture filtered. The filtrate is diluted with three times its volume of water, and extracted with diethyl ether. The extract is washed with water, dried and evaporated, to yield the 1-cyclopropyl-1-(4-methoxyphenyl)-ethyleneoxide.

It is dissolved in 600 ml benzene, 1.9 g p-toluenesufonic acid are added and the mixture refluxed overnight. It is washed with 5% aqueous sodium bicarbonate, water and brine, dried, evaporated, the residue distilled and the fraction boiling at 89° – 110°/0.1 mm Hg collected, to yield the α-cyclopropyl-α-(4-methoxyphenyl)-acetaldehyde.

EXAMPLE 20

The stirred suspension of 2.58 g α-(4-cyclohexylphenyl)-α-cyclopropyl-acetic acid, 2.4 g N-bromosuccinimide and 100 ml carbon tetrachloride is refluxed for 8 minutes under irradiation of a light bulb. The mixture is filtered and evaporated to an oil consisting of crude α-[4-(1-bromocyclohexyl)-phenyl]-α-cyclopropylacetic acid. The mixture of 3.9 g thereof, 1.3 g potassium hydroxide and 100 ml ethanol is heated for approximately half an hour and concentrated to near dryness. The concentrate is taken up in water, the solution acidified with dilute hydrochloric acid and extracted with diethyl ether. The extract is washed with water, saturated aqueous sodium chloride, dried and evaporated. The residue is distilled in a high vacuum and recrystallized from diethyl ether and hexane, to yield the α-[4-(1-cyclohexenyl)-phenyl]-α-cyclopropylacetic acid of the formula

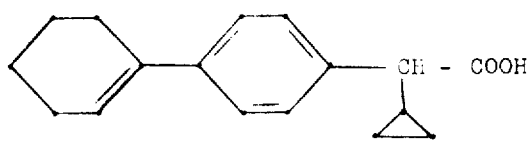

melting at 144°–146°C.

EXAMPLE 21

Preparation of 10,000 tablets each containing 50.0 mg of the active ingredient:

| Formula: | |
|---|---|
| α-cyclopropyl-α-(4-cyclohexylphenyl)-acetic acid | 500.00 g |
| Lactose | 1,706.00 g |
| Corn Starch | 90.00 g |
| Polyethylene glycol 6,000 | 90.00 g |
| Talcum powder | 90.00 g |
| Magnesium stearate | 24.00 g |
| Purified water | q.s. |

Procedure:

All the powders are passed through a screen with openings of 0.6 mm. Then the drug substance, lactose, talcum, magnesium stearate and half of the starch are mixed in a suitable mixer. The other half of the starch is suspended in 45 ml water and the suspension added to the boiling solution of the polyethylene glycol in 180 ml water. The paste formed is added to the powders which are granulated, if necessary, with an additional amount of water. The granulate is dried overnight at 35°, broken on a screen with 1.2 mm openings and compressed into tablets using concave punches with 7.1 mm diameter, uppers bisected.

In the analogous manner, tablets can be prepared, each containing 10 to 50 mg of a compound of the invention, especially such exemplified by the previous examples.

EXAMPLE 22

By replacing in Example 20 the starting material of Example 1 by the acids illustrated in Examples 4, 5, 11 and 15, the corresponding α-cyclopropyl-α-[3-chloro, nitro or propionylamino-4-(1-cyclohexenyl)-phenyl]-acetic acids are prepared; the latter may be hydrolysed to the 3-amino-compound in the usual manner, e.g., with the use of hydrochloric-acetic acid mixtures.

Analogously, the α-(cyclopropyl, cyclobutyl or cyclopropylmethyl)-α-[3-unsubstituted or 3-methyl-4-(1-cyclohexenyl)-phenyl]-acetic acids are obtained.

We claim:

1. The α-aryl-cycloaliphatic acid having the formula

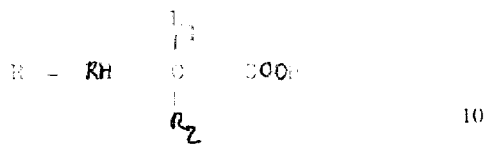

in which $R_1$ is hydrogen, lower alkyl or lower alkenyl, $R_2$ is 3 or 4 ring-membered unsubstituted cycloalkyl or cycloalkyl-lower alkyl, $R_3$ is unsubstituted or lower alkylated 5 to 7 ring-membered 1-cycloalkenyl, and Ph is $R_4$-1,4-phenylene, or (5 to 7 ring-membered 1-cycloalkenyl)-1,4-phenylene, wherein $R_4$ is hydrogen, lower alkyl, lower alkoxy, halogeno, trifluoromethyl or amino, or a lower alkyl ester the ammonium, an alkali metal or alkaline earth metal salt thereof.

2. A compound as claimed in claim 1, in which formula $R_1$ is hydrogen, $R_2$ is 3 to 4 ring-membered unsubstituted cycloalkyl or 3 to 4 ring-membered cycloalkyl-lower alkyl, $R_3$ is 5 to 7 ring-membered 1-cycloalkenyl, Ph is $R_4$-1,4-phenylene, and $R_4$ is hydrogen, lower alkyl, lower alkoxy, halogeno, trifluoromethyl or amino, or a lower alkyl ester, or the ammonium, an alkali metal or alkaline earth metal salt thereof.

3. A compound as claimed in claim 1 and having the formula

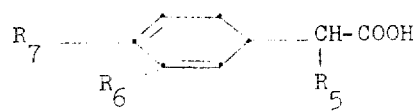

in which $R_5$ is 3 or 4 ring-membered unsubstituted cycloalkyl or cycloalkyl-lower alkyl, $R_6$ is hydrogen, lower alkyl, lower alkoxy, halogeno, trifluoromethyl or amino and $R_7$ is 5 to 6 ring-membered 1-cycloalkenyl, or a lower alkyl ester, the ammonium or an alkali metal salt thereof.

4. A compound as claimed in claim 3, in which formula $R_5$ is cyclopropyl, cyclobutyl or cyclopropylmethyl, $R_6$ is hydrogen, methyl, chloro or amino and $R_7$ is 1-cyclohexenyl, or the ammonium or an alkali metal salt thereof.

5. A compound as claimed in claim 3 and being the α-cyclopropyl-α-[4-(1-cyclohexenyl)-phenyl]-acetic acid.

* * * * *